March 8, 1932.  I. A. WEAVER  1,848,447
VEHICLE WASHING APPLIANCE
Filed Oct. 5, 1928
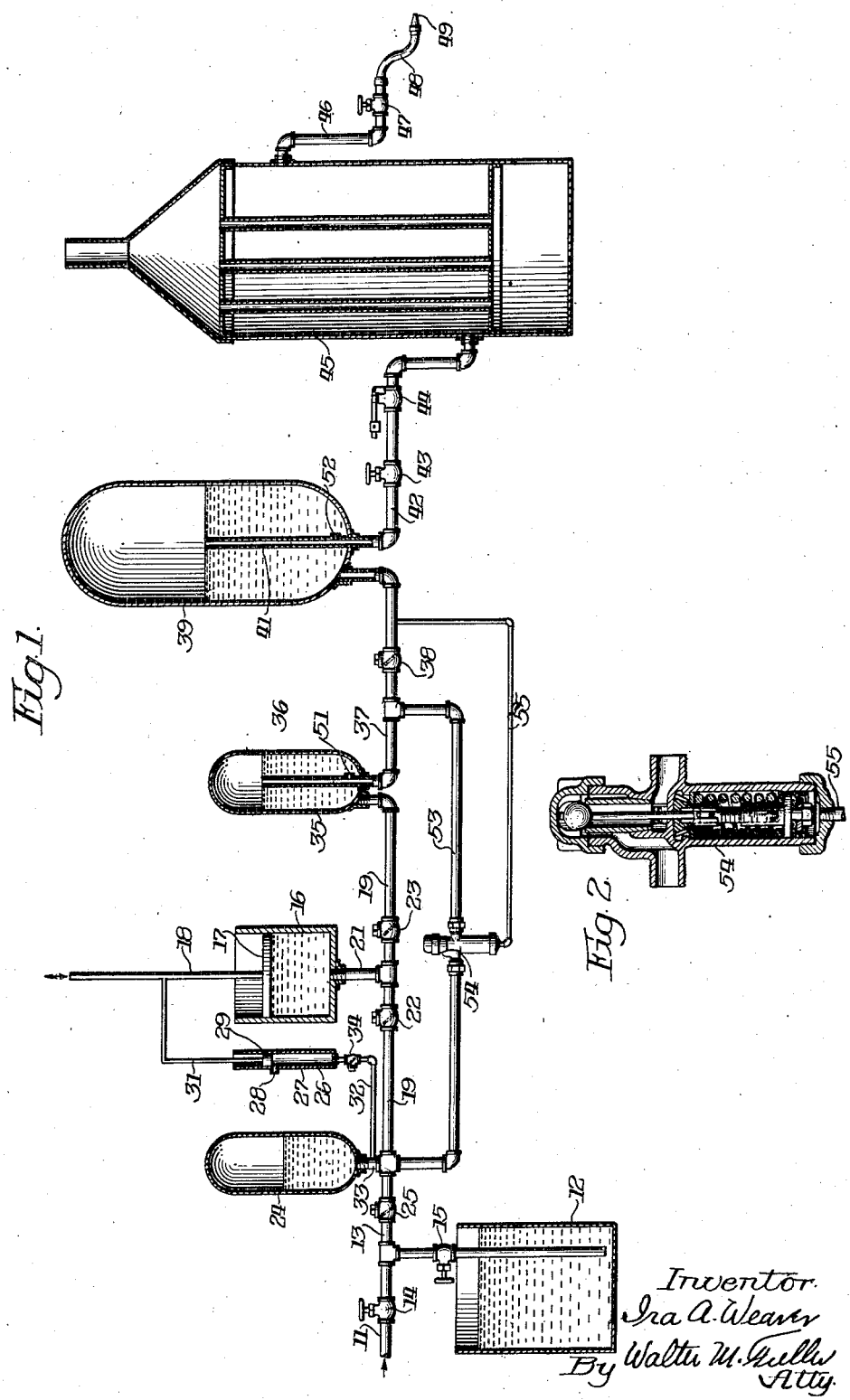
Inventor.
Ira A. Weaver
By Walter M. Fuller
Atty.

Patented Mar. 8, 1932

1,848,447

UNITED STATES PATENT OFFICE

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS

VEHICLE WASHING APPLIANCE

Application filed October 5, 1928. Serial No. 310,495.

My invention pertains, in general, to the conditioning or charging of a liquid with a gas and the control of the mixture, and relates more especially, but not necessarily in a limiting manner, to appliances for charging water with air for use for cleaning purposes, such as the washing of automobiles and the like.

I have found, that, if the water under pressure so employed is substantially uniformly filled or laden with minute bubbles or globules of air, the water in that condition having a somewhat milky appearance if allowed to discharge slowly, and if it reaches the vehicle thus charged with air, an unusually effective cleaning operation takes place, probably due to the expansion of the air bubbles when they strike the surface to be washed, with their resulting loosening effect on the adhering dirt particles and the spreading of the water.

Stated a little differently, the multiplicity of small air bubbles throughout the body of water seemingly act collectively to cushion the water as a whole, whereby the combined water and air engaging the dirty or fouled surface clean it efficiently and rapidly without injury to its highly-finished surface material, such as paint, varnish, etc.

One aim of the invention is to control automatically the amount of air pressed or forced into the water under its different conditions of delivery through the discharge nozzle, whether as a solid stream or in the form of a spray, so that the water may be in its best condition to perform its intended function or work.

Experience has demonstrated that the correct proportion of air to be forced into the water is an important factor, because if too little is used, the most advantageous effects are not secured, and if too much is employed, the air-bubbles seem to consolidate or coalesce and become so large that they expand prematurely and do not reach the body to be washed in the desired form to most effectively carry out their dirt removing action to maximum advantage.

At the present time, I am employing air to about 5% of the volume of water used, but the invention is in no way restricted to any particular or precise ratio of the two.

So far as is known, such finely aerated water penetrates the cracks and crevices and acts on any soap or other solution used in a manner wholly different from what has heretofore been accomplished by the use of water and air alone.

Before the making of the present invention, water and air have been mixed at the delivery nozzle, so that the expansion of the air would increase the velocity of the associated delivered water, hence giving the latter a greater striking energy or force to remove the dirt or grease from the surface to be cleaned. The effect of such a procedure is much the same as that of a high-pressure stream broken up into a spray by a properly constructed nozzle, and such a system ordinarily operates under a comparatively low pressure.

One of the leading objects of this invention is to so thoroughly and completely aerate the water under relatively high pressure that the air bubbles introduced into the water will be so small or minute in diameter or size and so uniformly disposed throughout the body of water that they will actually reach the work in that condition and penetrate or enter the cracks or crevices of the body to be cleaned, the expansion of such air globules removing the dirt in a manner and according to a principle heretofore unknown.

Expressed otherwise, the water under substantial pressure is completely and substantially uniformly impregnated with very small air bubbles, and this is not the employment of the mere injector principle nor of the mere consolidation of water and air streams irrespective of how well mixed they may be.

The entrained air provides sufficient cushioning effects to protect the delicate finish of the cars and the like from injury, and when soaps or cleaning solutions are used on finely finished surfaces, which are likely to produce damaging effects if not completely and fully removed, the expansion of the bubbles of the highly aerated water, when they reach the work, fully atomizes the water causing it also to reach the cracks and crevices, the spaces around the door handles, and the like, dislodging and carrying away all traces of such cleaning media and reducing the sponging and chamoising to a minimum.

Water supplied from a high-pressure pump in cleaning cars is ordinarily delivered to the surface to be cleaned through a nozzle capable of ready adjustment to discharge a spray for the finished body or to deliver a solid cutting stream to remove mud and grease from the chassis, or for cleaning the engine or parts when undergoing repairs.

Obviously, if too much air were mixed with the water, when a solid stream is being employed, it would decrease the weight of and spread the stream to such an extent or degree that it would not be as effective in its cleaning function as a more condensed or compact stream would be in acting on a smaller extent of surface in detaching caked mud or accumulated grease.

Accordingly, in the new system, a greater amount of air is mixed with the water when using a spray than when employing a straight, cutting stream.

An additional feature of the invention is the provision of means to heat the aerated water after it leaves the pump, the custom heretofore having been to heat the water before the pressure is applied to it, the latter practice necessitating a considerable economic loss of heat from radiation through the pipes and pump, and, in such cases, if the water is too hot and forms steam, trouble is encountered in bringing it up to a high pressure, and furthermore, difficulty is usually experienced in maintaining the packings in proper condition when pumping hot water.

As contrasted with the foregoing, in my appliance and in accordance with the principles of my invention, the air and water are pumped together to obtain the required pressure and then such aerated water is heated, thus avoiding many of the inconveniences and hindrances specified.

To permit those acquainted with, or trained in, this art to fully understand the invention, both from structural and functional standpoints, in the accompanying drawings, forming a part of this specification, I have shown a present, preferred embodiment of the invention more or less diagrammatically.

In the drawings:

Figure 1 shows the complete appliance; and

Figure 2 illustrates the unloading valve in longitudinal section.

Referring to the drawings, the water supply, such as city water under ordinary service pressure, may enter through the admission pipe 11, or the water may be drawn up by suction into the system from a tank or receptacle 12, the inlet pipe 13 having valves 14 and 15 between itself and the two sources of supply, so that either one may be availed of independently of the other by the suitable opening and closing of such manually-operated valves.

The water-pump 16 shown conventionally, and having the reciprocatory piston 17 and its actuating piston-rod 18, is connected to the main pipe 19 through the conduit 21, and the pipe is equipped with the usual inlet and discharge check-valves 22 and 23, respectively.

Pipe 19, beyond valve 22, is joined to the lower end of an intake air-chamber vessel or dome 24 between which and the pipe 13 another check-valve 25 is inserted in the piping system.

The apparatus includes also a small air-pump, characterized as a whole 26, having a cylinder 27 with an air-inlet port 28 through its side, a reciprocatory piston 29 sliding in the cylinder and having a direct, mechanical, operating connection 31 with the piston-rod 18, whereby the two pistons of the pair of pumps are reciprocated simultaneously and with equal length strokes.

As is clearly depicted, the lower end of the air-pump cylinder is joined by a small pipe 32 to a short pipe 33 connecting the air-chamber member 24 to the pipe 19, such conduit 32 having a check-valve 34.

From the foregoing, it will be clear that, for every down stroke of the water-pump piston, a definite volume of air at predetermined pressure, about 5% of the volume of the pumped water, will be forced into the system on the intake side of the water-pump.

Pump 16 delivers the aerated water under pressure through check-valve 23 and pipe 19 into the lower end of a second or discharge air-chamber receptacle 35 which has an internal, upstanding, delivery-pipe 36 extending part way up its height, its upper end being open and its lower end being joined to a pipe 37 equipped with a check-valve 38, which carries the air-charged water into a third and larger air-chamber member 39 similarly fitted with an internal, discharge, stand-pipe 41 connected to a pipe 42 furnished with a hand-valve 43 and a safety-valve 44, such pipe carrying the water into a so-called flash-type heater 45, the burner of which is preferably automatically thermostatically controlled, the heated air-charged water under pressure leaving the heater through a pipe 46, hand-valve 47, hose 48 and nozzle 49.

The nozzle by which the delivered water is directed to the body to be washed is of the ordinary adjustable type for playing a solid stream or a spray.

As has been indicated, the top ends of the two, air-chamber, discharge-pipes 36 and 41 are open, and each of such pipes, near its lower end and inside of the air-chamber member, has a small bleeder or drain hole 51 and 52, respectively, through its side-wall for a purpose hereinafter indicated.

The piping system also has a by-pass or parallel pipe 53 around the water-pump, one end thereof being joined to the pipe 19 at the junction of the conduit 33 therewith and between the two check-valves 25 and 22, the other end being connected to the pipe 37 between the air-chamber member 35 and the check-valve 38, such by-pass pipe 53 having any suitable unloading-valve 54 of known construction connected in it and joined by a smaller pipe 55 to the pipe 37 between its check-valve 38 and the large air-chamber element 39.

As is well understood, the purpose of the employment of such by-pass arrangement is to reduce the load on the water-pump and its operating means, such as an electric-motor, when the full amount of water which the pump is capable of supplying is not being delivered by the nozzle, as when the latter is partially closed, under which circumstances, the unloading-valve automatically opens and short-circuits the pump, which then idly pumps the water through the by-pass continually until the conditions change to cause an automatic closure of the unloading valve, which action again restores normal pumping conditions.

The operation of the apparatus or system occurs practically as follows:—

The water may enter the water-pump cylinder either under city water pressure through connected pipes 13 and 19 and check-valves 25 and 22 with the hand-valve 14 open and the other manually-operated valve 15 closed, or the water or a suitable solution may be drawn or sucked into the pump from the container 12 when the valve 14 is closed and the valve 15 is open.

For every down-stroke of the water-pump piston or plunger, the air-pump feeds a definite or predetermined amount of air under pressure into the system, such air entering the air-pump cylinder through the small admission-port 28 which is momentarily opened or uncovered by the associated or companion piston when the latter nears the end of its up or backstroke.

Inasmuch as such air-pump forces its air into a piping-system containing water under pressure, the air which it delivers into the system is necessarily under about the same pressure.

The air is thus fed into the system on the intake side of the water-pump, so that the latter compresses the aerated water under such adequate pressure that the contained air-bubbles do not have any substantial tendency to unit to form unduly or objectionably larger ones and this arrangement assures proper and uniform mixing of water and air.

If city water under service pressure is employed as a source of supply, the delivery of such water into the system is intermittent by reason of the interrupted or discontinuous intake operation of the water-pump, and, in addition, the air-pump supplies its air to the system in analogous manner, and, to take care of the pressure pulsations which would otherwise occur, the first or inlet air-chamber member is used in the relation indicated.

Such air-cushion is also of service, though perhaps in somewhat lesser degree when the liquid is supplied from the container 12.

As will be readily comprehended, the water-pump forces the air-charged water through the intermediate and final air-chamber members in series relation and through the heater, if one is used, to the discharge nozzles, these chambers subduing or evening the pressure impulses in the usual way.

If the nozzle be suddenly closed, the increased pressure resulting from such action is immediately transmitted through the pipe 55 to the unloading-valve 54 causing the automatic opening of the latter, thus affording a free passage for the water through said by-pass around the pump, the latter then working, without material expenditure of power, to circulate the water idly through the short-circuit afforded by the by-pass.

The pressure beyond the check-valve 38 in the chamber 39, heater, and that part of the piping system is trapped and not lost or wasted because the valve 38 closes and preserves it.

Thus the work done and the power expended previously in producing such pressure is availed of, because the created pressure is not allowed to be dissipated.

When the nozzle is thus closed and the by-pass and unloading valve are open, the air-cushion chamber 35 performs a double function.

Inasmuch as under the stated condition, the water being pumped does not reach the larger air-cushion chamber 39, such intermediate one 35 acts as the cushion, whereby the impulses imparted by the pump to the water will not vibrate the unloading-valve.

Besides acting as such cushion, the member 35, containing both water and air, assists in keeping the water-pump properly primed by reason of a small stream of water flowing through the small outlet 51, which is delivered through the then open by-pass and unloading valve to the intake side of the water-pump.

When the appliance is pumping from the barrel or receptacle 12, should the valve in the intake line have a slow leak, and should the pumps continue running with the discharge nozzle closed and the by-pass open, the air-pump would gradually build up a pressure sufficient to force all of the water out of the pump.

Therefore, in pumping from the barrel or container where suction is required, the continued operation of the aerator-pump, which delivers air into the line at a sufficient pressure to act as a cushion in the intake air-chamber on the water when connected to a high pressure service main, would cause a draining off of the small amount of water in the pump-cylinder and associated pipes, unless the feed of reserve water through the aperture 51 compensates for the slow leak over a comparatively long period while the pump is idling.

Under ordinary operating conditions, the air-chamber 35 is about half full of water and half filled with air.

As soon as the nozzle is fully opened again, the unloading-valve closes and the by-pass becomes inoperative as a short circuit around the water-pump.

One of the difficulties of compressing air with water is that the air-chambers tend to become completely filled with air and, so far as the large chamber 39 is concerned, this would be a desirable or ideal condition to smooth out the pulsations of the pump, but should a small amount of water in the hose leak out through the hose or around its connection, when the pump is shut down for a short period, the water would first leak out and then the air from the chamber would immediately be discharged through the leak, and it would be some little time before normal action would be restored after the pump was again started.

To avoid such an occurrence, the discharge-pipe 41 of the air-chamber extends about half way up the height of the chamber and the small orifice 52 is near the bottom of such container.

This air chamber is also ordinarily half full of water and half filled with air, and the hole 52 is large enough to compensate for any leakage in the hose between car-washing operations, when the pump is out of action, thus precluding the escape of air from the chamber, but it is to be understood that such port is not large enough to supply the full amount of water to the nozzle when the latter is open, so that the water level in the chamber is ordinarily at the top of the pipe through which open end the major portion of the water fed to the nozzle overflows.

It will be noted that through the action of the by-pass and its unloading-valve relatively more air is fed to the water when a spray is being delivered at the nozzle than when using a solid cutting stream, for the reason that the incoming water to the pump from the source of supply can only equal the amount of water passing through the nozzle, the remainder flowing through the short-circuit or by-pass.

Inasmuch as the air-pump delivers the same amount of air per stroke, regardless of the volume of water passing through the nozzle, which is smaller with a spray than with a solid stream, relatively more air is pressed into the water when the spray is employed.

If the nozzle is completely shut and the pumps are still operating, the clearance between the face of the piston of the water-pump and the cylinder end-wall is sufficient to prevent an excessive air pressure from entering the system.

An advantage of injecting the air at the intake side of the water-pump and adjacent to the air-chamber 24 is that it maintains the latter charged with an adequate quantity of air whereby to cushion the intermittent flow of water from the main, due to pulsations of the pump, and thus preclude the occurrence of objectionable noises in the plumbing.

From the foregoing, it will also be apparent, that when hot water is used, the water is heated after it is put under pressure with the air to prevent any radiation as it passes through the pump and piping system.

Attention is directed also to the fact that the discharge-pipe for the heater is near the top thereof making it impossible to siphon all of the water out of such appliance, with danger of injury to such heater, should the heater be turned on before the water is supplied to the boiler.

The safety-valve 44 is used on the incoming water line so that when it relieves the pressure, cold water will be forced out before the hot water can reach it.

The invention is not limited and restricted to the precise and exact details of construction shown and these may be modified within comparatively wide limits without departure from the heart and essence of the invention as defined by the appended claims and without the loss or sacrifice of any of its substantial benefits accruing from the employment of the invention.

I claim:

1. In a washing appliance of the character described, the combination of means to charge water with about five per cent of its volume with air, means to increase the pressure of such aerated water, and means to discharge such aerated water of augmented pressure for washing purposes.

2. In a washing appliance of the character described, the combination of means to charge water with air to the extent of about five per cent by volume of the water and at a pressure greater than atmospheric, and means to deliver such aerated water under pressure for washing purposes.

3. In a washing appliance of the character described, the combination of means to substantially uniformly charge water to the extent of about five percent of its volume with air bubbles of such size and under such pressure that there is practically no tendency for the bubbles to consolidate into larger ones, and means to deliver such aerated water under pressure for washing purposes.

4. In a washing appliance of the character described, the combination of a water-pump having intake and discharge conduits, an adjustable delivery-nozzle connected to said discharge-conduit, an air-pump to deliver air into the water in said intake-conduit to substantially uniformly aerate the water, means to operate said water and air pumps simultaneously and in a predetermined unchangeable capacity relation to one another, and an automatically-controlled by-pass conduit around said water-pump, whereby when said by-pass is open the water is charged with a greater percentage of air.

5. In a washing appliance of the character described, the combination of a water-pump having intake and discharge conduits, means to operate said water-pump, means to pump air into said intake-conduit in an unchangeable ratio to the water pumped by said water-pump whereby the water-pump operates on substantially uniformly aerated water, an air-chamber connected to said discharge-conduit, a by-pass conduit connected to said intake-conduit and to said discharge-conduit on the side of said air-chamber remote from said water-pump, an unloading-valve in said by-pass, and means to effect the automatic opening and closing of said unloading valve.

6. In a washing appliance of the character described, the combination of a water-pump having intake and discharge conduits, means to operate said water-pump, means to pump air into said intake-conduit in an unchangeable ratio to the water pumped by said water-pump whereby the water-pump operates on substantially uniformly aerated water, an air-chamber connected to said intake-conduit, an air-chamber connected to said discharge-conduit, a by-pass conduit connected to said intake-conduit and to said discharge-conduit on the side of said discharge air-chamber remote from said water-pump, an unloading-valve in said by-pass, and means to effect the automatic opening and closing of said unloading-valve.

7. In a washing appliance of the character described the combination of a water-pump having intake and discharge conduits, means to operate said water-pump, means to pump air positively into said intake-conduit in an unchangeable ratio to the water pumped by said water-pump, whereby said water-pump operates on aerated water, and means to automatically keep said water-pump primed.

8. In a washing appliance of the character described, the combination of a water-pump having intake and discharge conduits, means to operate said water-pump, means to pump air in an unchangeable ratio to the water pumped by said water-pump into said intake-conduit to substantially uniformly aerate the water, whereby said water-pump operates on aerated water, a by-pass conduit around said water-pump, an automatically-acting unloading-valve in said by-pass, and means to automatically keep said water-pump primed.

9. In a washing appliance of the character described, the combination of a water-pump having intake and discharge conduits, means to operate said water-pump, means to pump air into said intake-conduit, whereby said water-pump acts on aerated water, a by-pass conduit around said water-pump connected to said intake and discharge conduits, an automatically-acting unloading-valve in said by-pass, and an air-chamber member in said discharge-conduit between said water-pump and the junction of said discharge and by-pass conduits, said air-chamber member being adapted to be partly filled with water delivered thereinto and having a water leak to keep said water-pump primed.

10. In a washing appliance of the character described, the combination of a water-pump having intake and discharge conduits, means to operate said pump, means to aerate the pumped water, a delivery-nozzle connected to said discharge-conduit, an air-chamber connected in series relation in said discharge-conduit and adapted to be partially filled with water and partly filled with air, and means to cause a leakage of water from said chamber sufficient to satisfy a leakage from said discharge-conduit, but insufficient to supply the delivery capacity of said nozzle when the latter is open.

11. In a washing appliance of the character described, the combination of a water conduit, a water-pump in said conduit, means to operate said water-pump, means to charge the water with air, and an air-chamber member connected in said conduit, and having an admission opening and a discharge standpipe extended part way up the height of said member and open at its upper end through which the water may overflow and having a small bleeder port through its wall near its lower end, whereby a small flow of water may discharge through said port into said conduit, a by-pass connected to said conduit around said water-pump and air-chamber member, and means to open and close said by-pass automatically.

In witness whereof I have hereunto set my hand and seal.

IRA A. WEAVER.